F. BRIGGS.
BEET TOPPER.
APPLICATION FILED APR. 27, 1910.
984,795.
Patented Feb. 21, 1911.
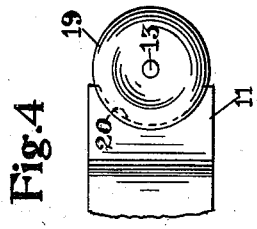
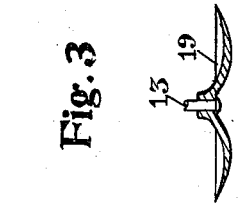
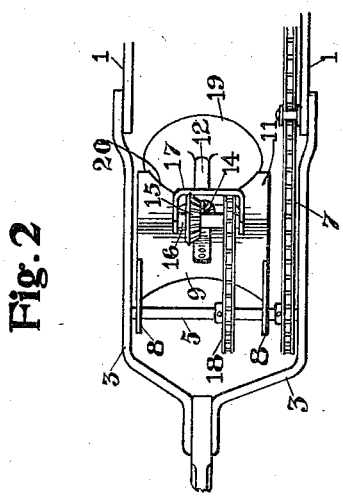
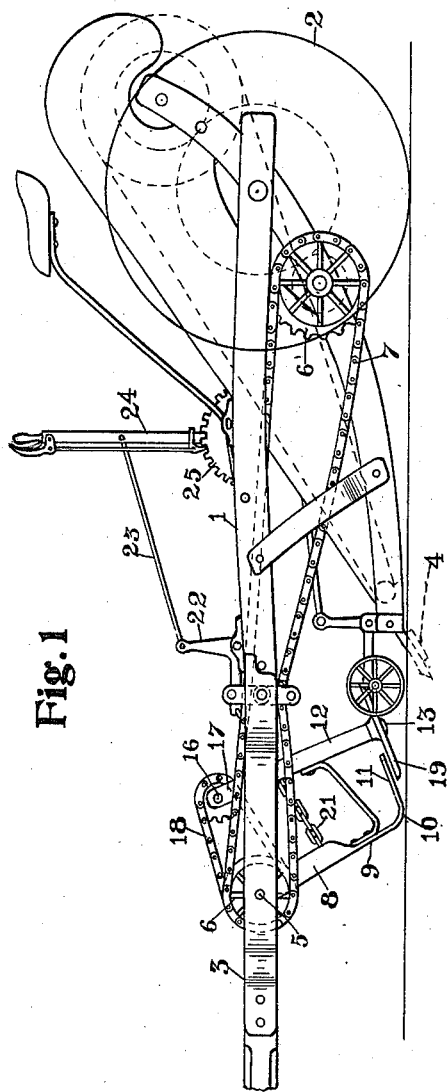
Witnesses
A. M. Shannon.
A. M. Dorr.
Inventor
FRANK BRIGGS
By 
Attorneys
THE NORRIS PETERS CO., WASHINGTON, D. C.

UNITED STATES PATENT OFFICE.

FRANK BRIGGS, OF LEAVENWORTH, WASHINGTON, ASSIGNOR TO BRIGGS BEET HARVESTER COMPANY, OF SPOKANE, WASHINGTON, A CORPORATION OF WASHINGTON.

BEET-TOPPER.

984,795.

Specification of Letters Patent.  Patented Feb. 21, 1911.

Application filed April 27, 1910. Serial No. 557,911.

*To all whom it may concern:*

Be it known that I, FRANK BRIGGS, a citizen of the United States of America, residing at Leavenworth, in the county of Chelan and State of Washington, have invented certain new and useful Improvements in Beet-Toppers, of which the following is a specification, reference being had therein to the accompanying drawings.

This invention relates to beet harvesters of the class wherein the beets are both topped and lifted in substantially one operation, as described in an application of mine for beet harvesters filed Sept. 23, 1909, Serial No. 519,181, and more particularly to a topping mechanism which is positive and self gaging in its action.

The invention consists in the matters hereinafter set forth, and more particularly pointed out in the appended claims.

In the drawings, Figure 1 is a view in side elevation, largely diagrammatic, of a beet harvester equipped with a topper that embodies features of this invention; Fig. 2 is a plan view of the topper; Fig. 3 is a view in detail in section of a rotary cutter; and Fig. 4 is a view of the lower side of the cutter together with the adjacent portion of the gage plate.

Referring to the drawings a main frame 1 of suitable design is supported on a pair of traction bearing wheels indicated at 2, and has a forward extension 3 pivotally secured to its forward end. Beet lifting mechanism indicated at 4 is secured to the main frame back of the extension.

A transverse shaft 5 is journaled near the forward end of the extension 3 and is driven from the traction wheels 2 by any suitable connection as, for example, sprocket wheels 6 and chain 7. A pair of parallel hangers 8 are pivotally supported near their upper ends on the shaft 5 and are rigidly secured at their lower ends to a gage plate 9. The latter is bent transversely at substantially right angles near its lower ends and is arranged so that the rounded shoulder 10 at this bend trails freely on the surface of the ground, with the inner upwardly extending arm 11 of the plate slightly oblique to the surface. A bearing bracket 12 of suitable design is secured to this plate and a cutter spindle 13 is journaled therein so as to rotate in a plane substantially perpendicular to the plane of the arm 11. The spindle is driven from the shaft 5 by any suitable means, as, for example, a beveled pinion 14 on the upper end of the spindle meshing with a gear 15 that is mounted on a shaft 16. The latter is journaled in a yoke 17 on the bracket end and is operatively connected to the shaft 5 by chain and sprockets indicated at 18.

A cutter disk 19 is secured to the lower end of the spindle to rotate parallel to and at a narrow interval from the gage plate arm 11, whose end adjacent the wheel has a concave margin 20 corresponding to the contour of the disk periphery and overlapping the latter slightly. The disk itself is dished with its sharp or cutting edge slightly inbent toward the plate arm.

The topping mechanism may be raised clear of the ground by any suitable means which does not interfere with its freely following the irregularities of the surface of the ground when in operation. As herein indicated a chain 21 connects one of the hangers 8 with a bell crank 22 which is coupled by a link 23 with a hand lever 24 engaging a quadrant 25 on the main frame.

In operation the slightly rounded angle or corner of the gage plate is adjusted to trail on the ground and crushes the tops down and holds them out of the way of the disk cutter as the machine advances. When the crown of the beet is encountered the gage rides up on it, carrying the cutter so that the latter slices off a predetermined portion of the exposed body or crown of the beet together with the top, the rotation of the cutter sweeping the beet tops to one side and leaving the beets clear for any subsequent operation thereon.

Obviously, changes in details of construction may be made without departing from the spirit of the invention, and I do not limit myself to any particular form or arrangement of parts.

What I claim as my invention is:

1. In a beet harvester having a main frame with depending beet lifters rigidly secured thereto and adapted to penetrate the earth, and traction wheels carrying the frame, means for cutting and removing beet tops from the path of the lifters, consisting of an extension frame pivotally supported on the main frame in advance of the lifters, a gage plate bent transversely between its ends, its upper end being pivotally secured to the extension and its angle adapted to trail on the ground in advance of the lifters with the rearwardly extending arm of the plate slightly uptilted, a disk journaled on the plate to rotate in a plane parallel to and slightly below the said arm whose rear edge overlaps the disk slightly and conforms to the cutting edge of the latter, and driving means operatively connecting the disk and traction wheels.

2. In a beet harvester having a main frame with depending beet lifters rigidly secured thereto and adapted to penetrate the earth, and traction wheels carrying the frame, means for cutting and removing beet tops from the path of the lifters, consisting of an extension frame pivotally supported on the main frame in advance of the lifters, a gage plate bent transversely between its ends, its upper end being pivotally secured to the extension and its angle adapted to trail on the ground in advance of the lifters with the rearwardly extending arm of the plate slightly uptilted, a disk journaled on the plate to rotate in a plane parallel to and slightly below the said arm whose rear edge overlaps the disk slightly and conforms to the cutting edge of the latter, and driving means operatively connecting the disk and traction wheels, the disk having an upwardly curved margin and raised central portion.

In testimony whereof I affix my signature in presence of two witnesses.

FRANK BRIGGS.

Witnesses:
L. J. NELSON,
F. A. KENYON.